(12) United States Patent
Jeansonne et al.

(10) Patent No.: US 9,734,339 B2
(45) Date of Patent: Aug. 15, 2017

(54) RETRIEVING SYSTEM BOOT CODE FROM A NON-VOLATILE MEMORY

(71) Applicant: HEWLETT-PACKARD DEVELOPMENT COMPANY, L.P., Houston, TX (US)

(72) Inventors: Jeffrey Kevin Jeansonne, Houston, TX (US); Jon G Lloyd, Houston, TX (US); Rahul V Lakdawala, Houston, TX (US); Justin C Prindle, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/780,977

(22) PCT Filed: Apr. 23, 2013

(86) PCT No.: PCT/US2013/037733
§ 371 (c)(1),
(2) Date: Sep. 28, 2015

(87) PCT Pub. No.: WO2014/175866
PCT Pub. Date: Oct. 30, 2014

(65) Prior Publication Data
US 2016/0063254 A1 Mar. 3, 2016

(51) Int. Cl.
*G06F 9/44* (2006.01)
*G06F 21/57* (2013.01)
*G06F 21/60* (2013.01)

(52) U.S. Cl.
CPC .......... *G06F 21/575* (2013.01); *G06F 21/606* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,819,087 A | * | 10/1998 | Le .................. G06F 9/4401 710/10 |
| 7,930,532 B2 | | 4/2011 | Lin et al. |
| 7,930,576 B2 | | 4/2011 | Harris et al. |
| 8,082,384 B2 | | 12/2011 | Sareen et al. |
| 8,255,988 B2 | | 8/2012 | Carpenter |
| 2009/0150662 A1 | | 6/2009 | Desselle et al. |

(Continued)

FOREIGN PATENT DOCUMENTS

| | | |
|---|---|---|
| CN | 101458743 A | 6/2009 |
| KR | 20090034104 | 4/2009 |
| KR | 20100017874 | 2/2010 |

OTHER PUBLICATIONS

Hodge et al., International Application No. PCT/US13/37725 entitled Redundant System Boot Code in a Secondary Non-Volatile Memory filed Apr. 23, 2013 (25 pages).

(Continued)

*Primary Examiner* — Paul Yanchus, III
(74) *Attorney, Agent, or Firm* — Trop, Pruner & Hu (57) ABSTRACT

A controller monitors for an indication from core logic indicating that the core logic is in a state in which the core logic does not access a bus. In response to detecting the indication, the controller retrieves the system boot code from a non-volatile memory over the bus.

12 Claims, 4 Drawing Sheets

(56) References Cited

U.S. PATENT DOCUMENTS

2009/0217373 A1  8/2009  Stillerman et al.
2010/0082968 A1  4/2010  Beverly
2011/0060899 A1  3/2011  Hsieh et al.

OTHER PUBLICATIONS

Jeansonne et al., International Application No. PCT/US13/37724 entitled Recovering From Compromised System Boot Code filed Apr. 23, 2013 (29 pages).
Jeansonne et al., International Application No. PCT/US13/37727 entitled Configuring a System filed Apr. 23, 2013 (35 pages).
Jeansonne et al., International Application No. PCT/US13/37728 entitled Event Data Structure to Store Event Data filed Apr. 23, 2013 (36 pages).
Jeansonne et al., Internationai Application No. PCT/US13/37729 entitled Repairing Compromised System Data in a Non-Volatile Memory filed Apr. 23, 2013 (25 pages).
Jeansonne et al., International Application No. PCT/US13/37735 entitled Verifying Controller Code and System Boot Code filed Apr. 23, 2013 (36 pages).
Lee; "Embedded Controller Usage in Low Power Embedded Designs an Overview",<http://download.intel.com/design/intarch/papers/326133.pdf>, Sep. 2011.

\* cited by examiner

RETRIEVING SYSTEM BOOT CODE FROM A NON-VOLATILE MEMORY

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some implementations are described with respect to the following figures.

DETAILED DESCRIPTION

System code used to perform startup of a computing system can include system firmware, which can be in the form of machine-readable instructions executable on a processor (or processors) of the computing system. "System firmware" can refer to any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

The initial portion of the BIOS code that is first executed when the computing system starts is a boot block. The boot block is usually considered to be trustworthy and is executed first before the rest of the BIOS code is allowed to execute on a processor in the computing system. The boot block can be used to check the integrity of the BIOS code as well as to perform other initial functions. If the boot block confirms the integrity of the BIOS code, then the boot block can pass control to the main portion of the BIOS code for initiating the remaining operations associated with the BIOS code.

In some implementations, the boot block can include core root of trust for measurement (CRTM) logic, which is logic specified by the Trusted Computing Group (TCG), an industry standard work group. During a power on procedure of the computing system, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system based on measurements taken by the CRTM logic.

In some cases, the boot block may become compromised. Although a protection mechanism can be provided in a computing system to protect the boot block from unauthorized write access, such protection mechanism may become compromised under certain conditions, which can subject the boot block to malware attacks. A compromised boot block may allow the computing system to be compromised. For example, the modified boot block can allow for unauthorized modification of various system code, can bypass integrity checks, can prevent the computing system from booting, can allow covert remote monitoring and/or control of the computing system by a malicious entity, can allow for unauthorized access and/or modification of data in the computing system by malware, can disable the computing system, and so forth. Compromised code (such as the boot block) can refer to code that has been corrupted such that the code is no longer usable, or alternatively, compromised code can refer to code that has been changed in some way but that is still able to execute.

In addition to the possibility of being compromised by malware, the boot block may also be compromised accidentally or unintentionally.

In the present discussion, although reference is made to a "boot block," it is noted that techniques or mechanisms can be applied to other types of system boot code, where system boot code can refer to any code that can boot a computing system after restart of the computing system or that can resume the computing system from a low power state.

In accordance with some implementations, an embedded controller is used to retrieve and perform verification of a boot block while core logic of a computing system is off of a shared bus that is also used by the embedded controller to access a non-volatile memory that stores the boot block. The embedded controller can monitor for an indication from the core logic that the core logic is off of the shared bus, and in response to such indication, the embedded controller can determine that it is safe for the embedded controller to retrieve the boot block over the shared bus from the non-volatile memory for performing verification of the boot block.

Verifying a piece of code, such as the boot block or other code, can refer to cryptographically validating that the piece of code has not been changed and/or confirming that the piece of code is from a trusted source.

Core logic of a computing system can refer to one or multiple control chips of the computing system that include specified functionalities. The specified functionalities can include a display interface to a graphics subsystem, a system bus interface to a system bus to which various input/output (I/O) devices can be connected, and so forth. In some examples, the core logic can include an I/O controller, such as a Platform Controller Hub (PCH) from Intel Corporation. In other examples, other types of control chips can be used.

Alternatively, the core logic can also be considered to include a processor of the computing system, which executes the operating system (OS), application code, system firmware code, and other code of the computing system.

The embedded controller is physically separate from the core logic (as well as from the processor of the computing system). The embedded controller can be used to perform specific predefined tasks, as programmed into embedded controller code (e.g. embedded controller firmware or EC firmware or software). In the ensuing discussion, although reference is made to "EC firmware," it is noted that techniques or mechanisms can be applied to other forms of the controller code that can be executed by the embedded controller. The embedded controller code includes machine-readable instructions executable on the embedded controller. Examples of tasks that can be performed by the embedded controller include any one or some combination of the following: power supply control in the computing system (for controlling a power supply that supplies power supply voltages to various components in the computing system), charging and control of a battery in the computing system, thermal monitoring (to monitor a temperature in the computing system), fan control (to control a fan in the computing system), and interaction with a user input device (such as performing a scan of a keyboard of the computing system or interaction with a pointing device such as a mouse, touchpad, touchscreen, and so forth). The embedded controller can be implemented with a microcontroller, an application-specific integrated circuit (ASIC), a programmable gate array (PGA), or any other type of programmable circuit.

Figure 1:
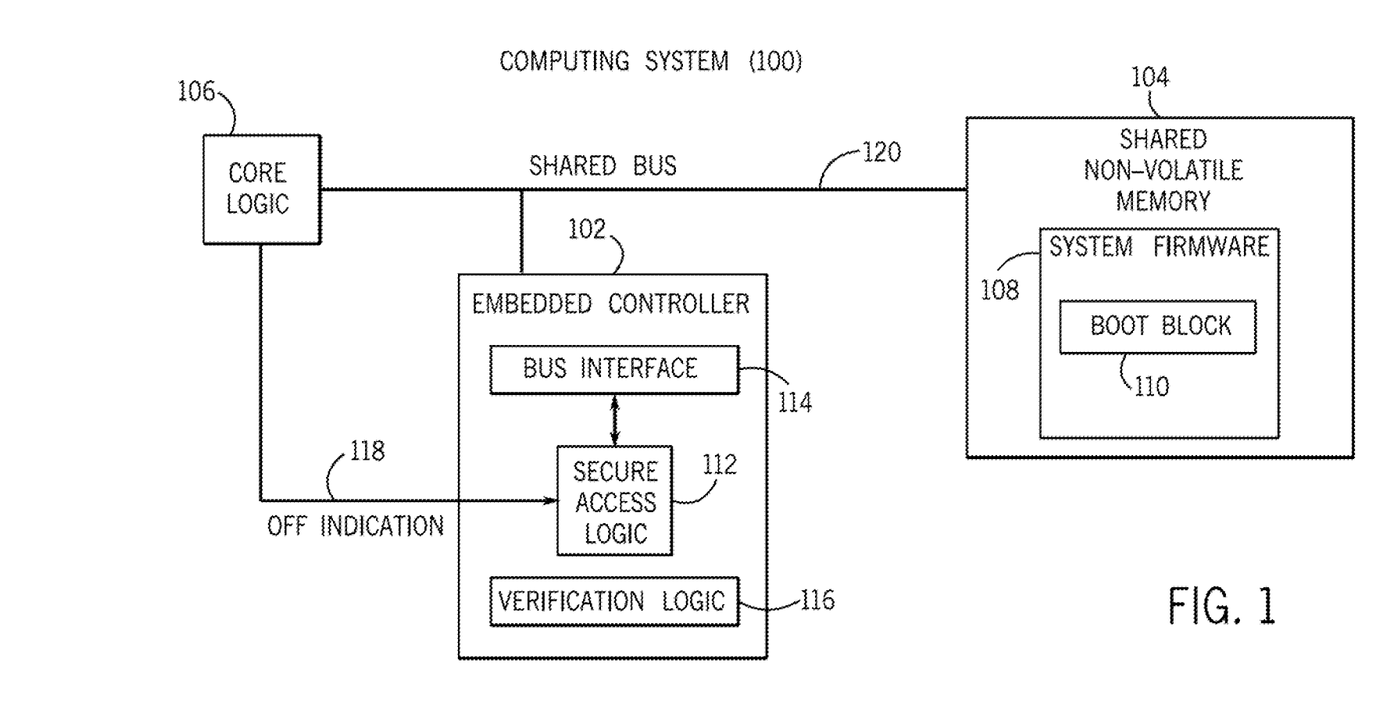
FIG. 1 is a block diagram of an example system according to some implementations.

FIG. 1 is a block diagram of an example computing system 100 that includes an embedded controller 102, a shared non-volatile memory 104, and core logic 106. The core logic 106 or embedded controller 102 can access the shared non-volatile memory 104 over a shared bus 120.

In some implementations, just one entity can have access to the shared bus 120 at any given time, such that just one entity can access the shared non-volatile memory 104 at a time. In some examples, the shared bus 120 is a shared Serial Peripheral Interface (SPI) bus. An SPI bus is a synchronous serial data link in which devices on the SPI bus operate in a master-slave mode. In other examples, another type of shared bus 120 can be used. In alternative examples, an arbitration mechanism can be provided to allow for shared access of the bus 120 in various states of the computing system, including a low power state and a normal runtime state.

The shared non-volatile memory 104 includes system firmware 108, such as BIOS code. The BIOS code can include a boot block 110. Although not shown in FIG. 1, a processor can be connected to the core logic 106. In this way, the processor can retrieve the system firmware 108 from the shared non-volatile memory 104 to execute on the processor.

The embedded controller 102 can perform verification of the boot block 110 prior to each restarted execution of the boot block 110 by the processor. Restarted execution of the boot block 110 can occur due to a cold reset of the computing system 100, a resume from a low power state of the computing system 100, an operating system restart, and so forth. It is noted that the boot block 110 can also be verified by the embedded controller 102 each time the computing system 100 enters a low power state. In other examples, the embedded controller 102 can also verify the boot block 110 when the processor remains powered.

In further examples, the embedded controller 102 can perform verification of the boot block 110 in response to a warm reset of the computing system 100, in which the computing system 100 is restarted without removing power to the computing system 100. To allow the embedded controller 102 to perform the verification in response to the warm reset, the computing system 100 can be forced to transition to an appropriate low power state when the warm reset is detected.

A low power state of the computing system 100 refers to a state of the computing system 100 in which the processor 106 and certain other hardware components of the system 100 are off (e.g. no power is provided to the processor and the certain other hardware components). In the low power state, power can still be provided to the embedded controller 102. The computing system 100 can transition to a low power state in any of the following scenarios: (1) as part of a cold reset of the computing system 100 that caused the system 100 to be powered off for subsequent power on, or (2) as part of a power savings procedure, in which the computing system 100 can transition from a normal operating state to a sleep state, hibernation state, or an off state after a time period of inactivity, or in response to detecting a low battery condition, or in response to user or application command, or for another reason, or (3) in any other scenario.

Examples of low power states can include certain Advanced Configuration and Power Interface (ACPI) states, including: the ACPI S3 state (which is a form of a standby or sleep state in which the system context of the computing system 100 is maintained in volatile memory that remains powered while some components of the computing system 100 are powered off); the ACPI S4 state (which is a form of hibernation state in which the system context is saved to persistent storage to allow power to be removed from additional computing system components, including volatile memory); and the ACPI S5 state (which is a form of system off state, in which power has been removed from even more components of the computing system 100).

Upon restarting of the boot block 110, the assumption is made that potentially un-trusted code had previously executed in the computing system 100, and as a result, the boot block 110 can no longer be assumed to be trustworthy and should be verified prior to next execution on the processor. In a state when the boot block 110 is to be executed (such as a state reached as a result of cold reset, entry into a low power state, operating system restart, and so forth), the processor is disabled and thus not executing code. The processor is disabled if the processor is in a powered off state (no power is provided to the main processing part of the processor) or in a reset state (e.g. a reset signal to the processor is asserted that prevents the processor from executing machine-readable instructions).

In some implementations, in a state when the processor is disabled, the core logic 106 is also off the shared bus 120. The core logic 106 being off the shared bus 120 refers to the core logic 106 not driving signals on the shared bus 120, such as by presenting a high impedance state at the bus interface in the core logic 106 to the shared bus 120. In examples where the core logic 106 is unable to provide a high impedance state, an external isolation switch can be provided between the core logic 106 and the shared bus. The external isolation switch can be activated to electrically connect the core logic 106 to the shared bus 120 (during states in which the core logic 106 is to access the shared non-volatile memory 104) or to electrically isolate the core logic 106 from the shared bus 120 (during states in which the core logic 106 is to be disabled from accessing the shared non-volatile memory 104).

In other implementations, the core logic 106 may include an entity that may still be active on the shared bus 120 even though the computing system 100 is in a state in which the processor is disabled. In such implementations, a further check is performed to ensure that the entity in the core logic 106 is also off the shared bus 120. An example of such an entity that can remain enabled and have access to the shared bus 120 in a low power state (or other state in which the processor is disabled) is a Management Engine (ME) that is part of a chipset from Intel Corporation. The ME provides functionalities to allow for monitoring, maintenance, updating, upgrading, and repairing of a computing system, for example. The ME can be provisioned to operate in a low power state (e.g. S3, S4, or S5 state). Another example of such an entity includes a Platform Security Processor (PSP) from Advanced Micro Devices (AMD), Inc.

The embedded controller 102 includes secure access logic 112 to determine when it is safe for the embedded controller 102 to retrieve the boot block 110 from the shared non-volatile memory 104 for verification. The secure access logic 112 receives an "off indication" 118 from the core logic 106. The off indication 118 can include an indication that the computing system 100 has entered a state (e.g. low power state or other state) in which the core logic 106 is off the shared bus 120. The off indication 118 can include a signal or a combination of signals asserted to specific state(s).

In implementations where the core logic 106 includes the entity (e.g. Intel ME or AMD PSP) that may potentially be still enabled and have access to the shared bus 120 while the computing system 100 is in a low power state, the off indication 118 can also be an indication that the entity is disabled and thus off the shared bus 120.

In response to receiving the off indication 118, the secure access logic 112 accesses the shared bus 120 through a bus interface 114 of the embedded controller 102. The bus interface 114 includes drivers and receivers to allow the embedded controller 102 to transmit and receive signals on the shared bus 120. The secure access logic 112 sends a command (or commands) over the shared bus 120 to retrieve the boot block 110.

Once the boot block 110 is retrieved from the shared non-volatile memory 104 into the embedded controller 102, a verification logic 116 in the embedded controller 102 performs verification of the boot block 110.

The secure access logic 112 and verification logic 116 can be part of a processing circuit of the embedded controller 102.

Figure 2:
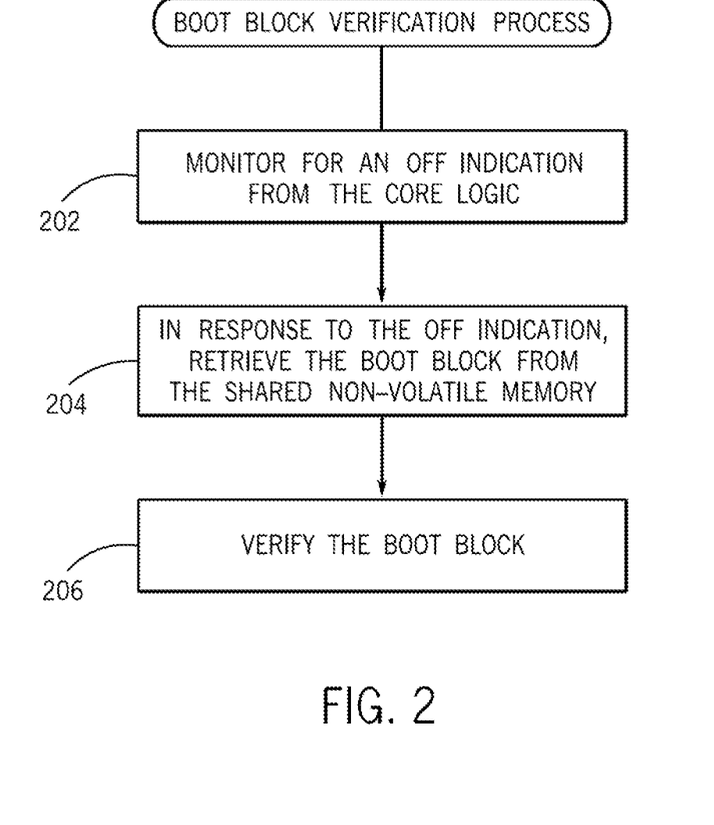
FIG. 2 is a flow diagram of a system boot code recovery process according to some implementations.

FIG. 2 is a flow diagram of a boot block verification process according to some implementations. The boot block verification process can be performed by the embedded controller 102. The embedded controller 102 monitors (at 202) for the off indication 118 from the core logic 106 indicating that the core logic 106 is off the shared bus 120 (is in a state where the core logic 106 does not access the shared bus 120).

In response to the off indication 118, the embedded controller 102 retrieves (at 204) the boot block 110 from the shared non-volatile memory 104. The embedded controller 102 then verifies (at 206) the retrieved boot block 110.

Figure 3:
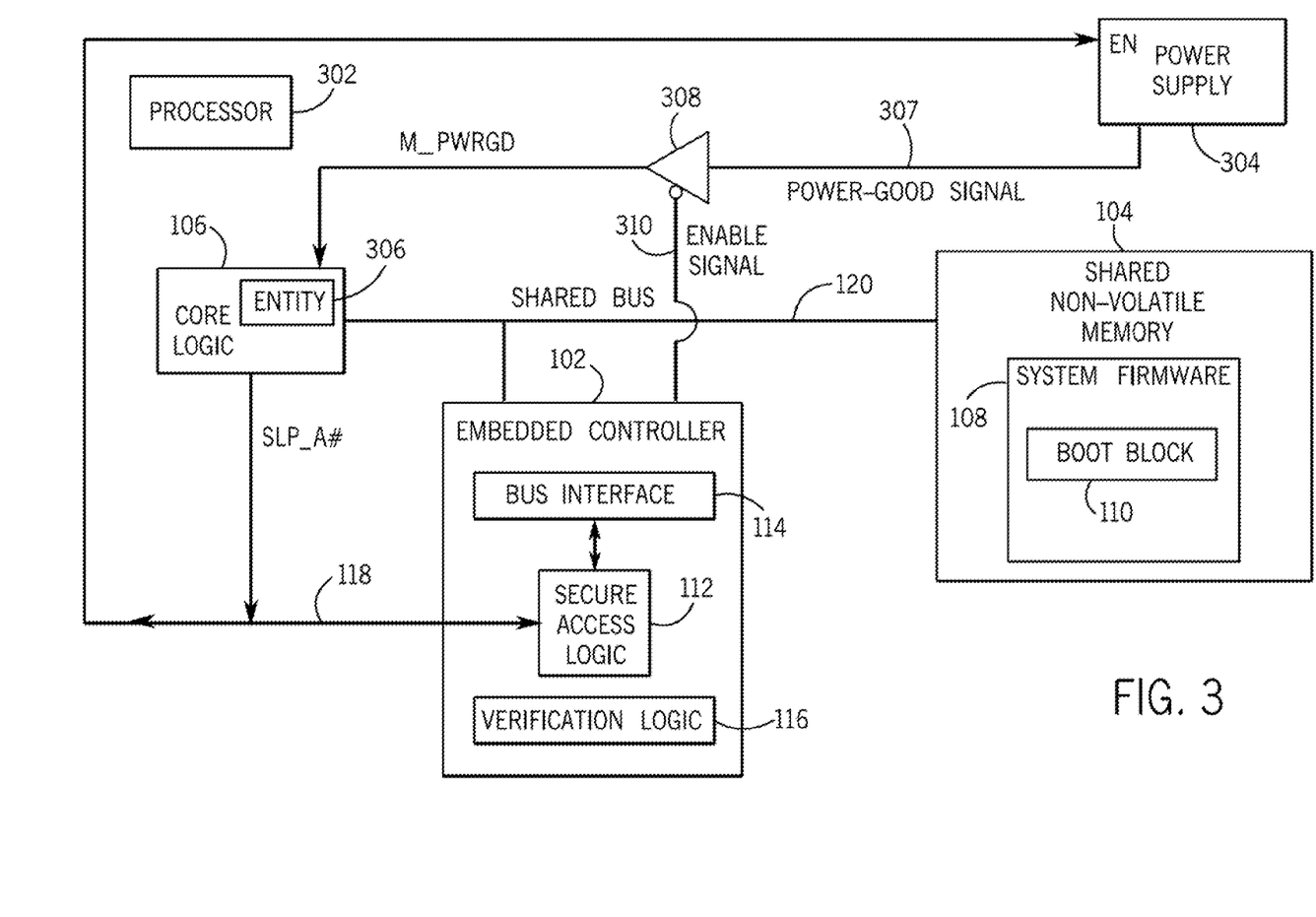
FIG. 3 is a block diagram of another example system according to further implementations.

FIG. 3 is a block diagram of the computing system 100 according to further implementations. In addition to the embedded controller 102, shared non-volatile memory 104, and core logic 106 of FIG. 1, the computing system 100 of FIG. 3 further includes a processor 302 connected to the core logic 106 and a power supply 304 that produces power supply voltages for powering components of the computing system 100. The power supply 304 also outputs a power-good signal 307, which when asserted to a specified state provides an indication that one or multiple power supply voltages output by the power supply 304 are within a range in which components are able to safely use the power supply voltage(s).

As noted above, the core logic 106 can include an entity 306 (e.g, Intel ME or AMO PSP) that may potentially be enabled while the computing system 100 is in a low power state. As a result, it may be possible for the entity 306 to resume from an off state while the embedded controller 102 is accessing the shared bus 120 when the system is in a low power state or other state in which the processor is disabled. To prevent such resumption of the entity 306 while the embedded controller 102 is accessing the shared bus 120, circuitry can be provided to block a power-good indication (e.g. the power-good signal 307 being at the asserted state) from being provided to the core logic 106. In FIG. 3, the circuitry for blocking the power-good indication includes a driver 308, which has an enable input connected to an enable signal 310 generated by the embedded controller 102.

If the enable signal 310 is deactivated, then a signal M_PWRGD output by the driver 308 is at a de-asserted state, which indicates to the entity 306 that the power supply voltage(s) of the power supply 304 is not in a safe range, and thus the entity 306 cannot resume from an off state. On the other hand, if the enable signal 310 is activated, then the state of the power-good signal 307 is allowed to pass through to the core logic 106. When the enable signal 310 is activated, a power-good indication provided by the power supply 304 can reach the core logic 106.

In other examples, other types of circuitry to prevent the core logic 106 from resuming can be used. An alternative example is the assertion of a battery-low signal (e.g. BATLOW# signal) to the core logic 106 by the embedded controller 102. The BATLOW# signal is an indication that the platform main battery may not be able to supply enough power for proper operation. The core logic 106 can be blocked from resuming by maintaining the batter-low signal asserted. De-asserting the battery-low signal allows the core logic 106 to resume.

The embedded controller 102 maintains the enable signal 310 deactivated (to block the power-good indication from the core logic 106) while the embedded controller 102 is accessing the shared bus 120. Once the embedded controller 102 has completed its operations that involve access of the shared bus 120, the embedded controller 102 can stop blocking of the power-good indication to the core logic 106.

In some implementations, in a sleep state such as the ACPI S3 state, there can be a specified maximum time that the embedded controller 102 is allowed to block the power-good indication to the core logic 106. If the embedded controller 102 is still blocking the power-good indication from the core logic 106 after the specified maximum time following a time when the core logic has indicated that resumption of the computing system from the S3 state is desired, then the core logic 106 may initiate a transition of the computing system from the S3 state to a lower power state, such as the S5 state, in which the S3 context stored in volatile memory would be lost. As a result, the embedded controller 102 is programmed to ensure that the retrieval and verification of the boot block 110 can be completed within this specified maximum time interval, so that the embedded controller 102 can unblock the power-good indication.

In examples according to FIG. 3, the off indication 118 of FIG. 1 can be an SLP_A# signal shown in FIG. 3. The SLP_A# signal can be produced by the entity 306, for example. If the entity 306 activates the SLP_A# signal to an asserted state, then that is an indication power can be removed from the entity 306, and so the entity 306 (as well as the remainder of the core logic 106) is off the shared bus 120.

If the SLP_A# signal from the entity 306 is at a de-asserted state, then the embedded controller 102 assumes that the shared bus 120 is in use by the entity 306. As a result, the embedded controller 102 does not attempt to access the shared bus 120.

The SLP_A# signal is also provided to an enable input of the power supply 304. When the SLP_A# signal is asserted, that is an indication to the power supply 304 that power can be removed from the entity 306 (and the rest of the core logic 106). As a result, in response to the SLP_A# signal being asserted, the power supply 304 deactivates the power-good signal 307.

In some examples, a policy setting in the computing system 100 can specify an aggressive mode. In the aggressive mode, the embedded controller 102 can force the entity 306 into the off state, even if the entity 306 remains enabled (indicated by the SLP_A# signal being in the de-asserted state). In some examples, when the computing system is in the ACPI S4 or S5 state, the embedded controller 102 can force the exclusive access of the shared bus 120 by asserting a reset signal (e.g. RSMRST#) to the core logic 106 to force the entity 306 into an off state. This technique of forcing exclusive access of the shared bus 120 is not used when the system is in the S3 state since it would cause a loss of the S3 context.

On the other hand, if the policy setting does not specify the aggressive mode, then the embedded controller 102 does not assert the reset signal to force the entity 306 into an off state when the SLP_A# signal is at the de-asserted state (which means that the entity 306 is enabled on the shared bus 120).

Note that when the computing system 100 is set in the aggressive mode, the embedded controller 102 would also trigger verification of the boot block 110 with each warm reset of the computing system 100, as noted above. This is achieved by the embedded controller forcing the computing system 100 to a low power state (e.g. S5 or another state) in response to the warm reset, to force the verification of the boot block 110 by the embedded controller 102.

Figure 4:
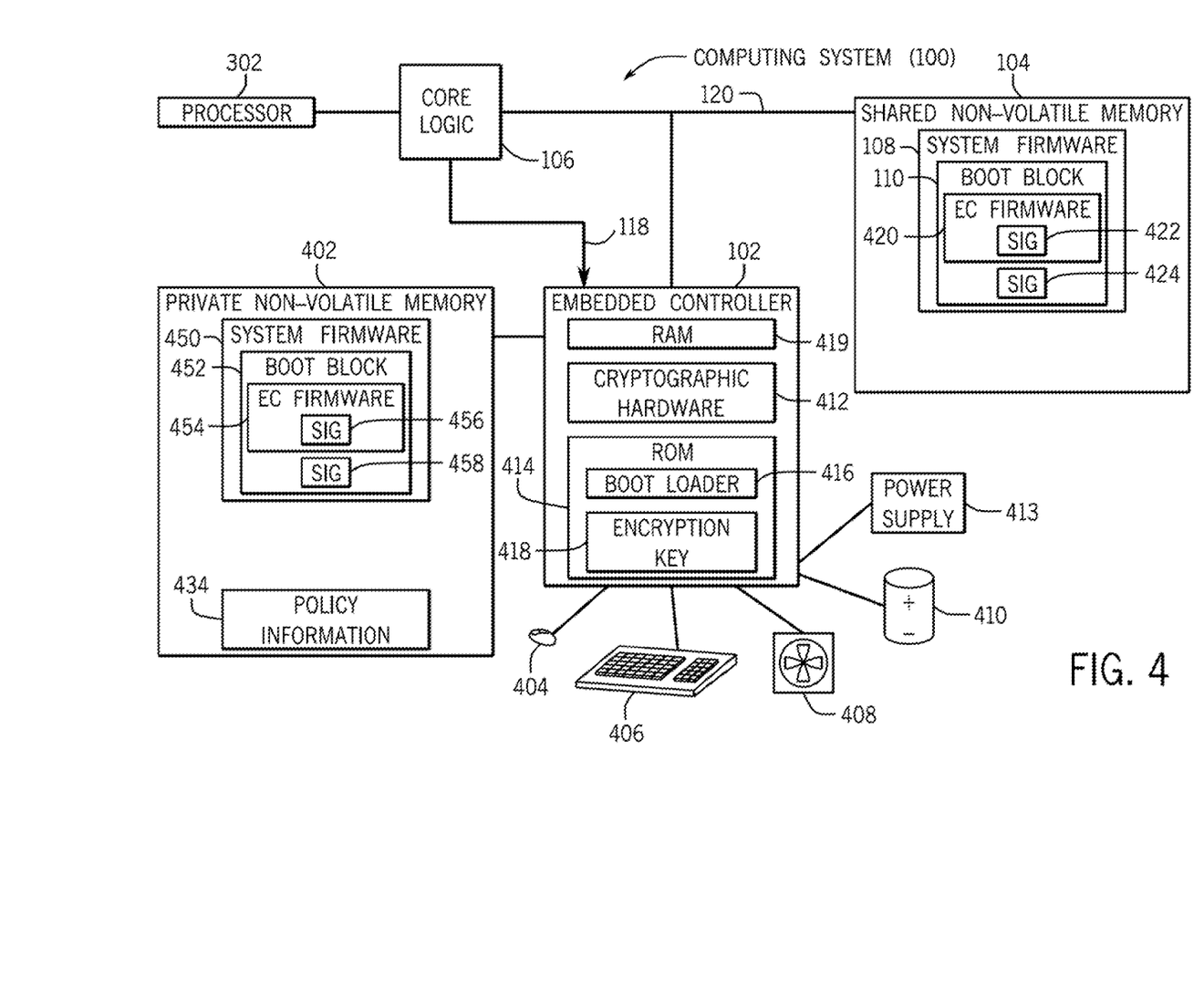
FIG. 4 is a block diagram of a further example system according to alternative implementations.

FIG. 4 is a block diagram of the computing system 100 according to alternative implementations. The computing system 100 of FIG. 4 includes a private non-volatile memory 402, in addition to the shared non-volatile memory 104. The private non-volatile memory 402 is accessible by the embedded controller 102, but is not accessible by the processor 302 or the core logic 106. Effectively, the private non-volatile memory 402 is electrically isolated from the shared bus 120.

The private non-volatile memory 402 includes a redundant copy 450 of the system firmware 108 that is in the shared non-volatile memory 104. The system firmware redundant copy 450 can be identical to the system firmware 108, or can be a different version from the system firmware 108. In case the embedded controller 102 detects in a verification procedure that the system firmware 108 in the shared non-volatile memory 104 is compromised, the embedded controller 102 can copy the system firmware redundant copy 450 to the shared non-volatile memory 104 to replace the compromised system firmware 108.

In examples according to FIG. 4, EC firmware 420 is included in the boot block 110 of the system firmware 108. The EC firmware 420 is executable on the embedded controller 102, to perform specified tasks of the embedded controller 102. In other examples, the EC firmware 420 is separate from the boot block 110 or system firmware 108. In the shared non-volatile memory 104, a signature 422 is associated with the EC firmware 108, and a signature 424 is associated with the boot block 110.

The system firmware redundant copy 450 in the private non-volatile memory 402 similarly includes a boot block 452 and an EC firmware 454. A signature 456 is associated with the EC firmware 454, and a signature 458 is associated with the boot block 452. The signature 422 or 456 is used in the verification of the respective EC firmware 420 or 454 by the embedded controller 102, while the signature 424 or 458 is used in the verification of the respective boot block 110 or 452 by the embedded controller 102. Use of a signature in the verification process can allow a determination of the authenticity of the respective EC firmware or boot block, and a determination that the respective EC firmware or boot block has not been compromised.

As depicted in FIG. 4, the embedded controller 102 is coupled to a user input device 404 (e.g. a mouse device or other type of input device), a keyboard 406, a fan 408, a battery 410, and a power supply 413, to manage the respective devices (under control of the EC firmware for example).

In the FIG. 4 example, the embedded controller 102 also includes cryptographic hardware 412, which can perform cryptographic computations, such as those used in the verifying of the EC firmware and the boot block. The cryptographic hardware 412 can be in the form of circuitry that is configured to perform cryptographic computations.

The embedded controller 102 further includes a read-only memory (ROM) 414, which can be used to store a boot loader 416 and an encryption key 418. The encryption key 418 can be the key (public key or private key) used to perform verification of the EC firmware (420 or 454). During system startup, the boot loader 416 is loaded from the ROM 414 to execute in the embedded controller 102 to retrieve EC firmware from the private or shared non-volatile memory 402 or 104 into a random access memory (RAM) 419 of the embedded controller 102. The boot loader 416 can take steps to ensure that no other entity except the embedded controller 102 has access to the shared bus 120 during the EC firmware load operation.

To retrieve an EC firmware for loading into the embedded controller 102, the boot loader 416 can find a pointer (or other reference) to an EC firmware image, which can be stored in the private or shared non-volatile memory 402 or 104.

The retrieved EC firmware is verified by the boot loader 416 that is able to invoke the cryptographic hardware 412 to assist in performing cryptographic computations.

In some implementations, the verification of the EC firmware 108 or 454 can be accomplished by decrypting the respective signature 422 or 456 using the encryption key 418 stored in the embedded controller ROM 414. Decrypting the signature produces a respective value (e.g. hash value) that can be compared with a corresponding calculated value (e.g. hash value) of the EC firmware. If the foregoing values match, then the EC firmware is verified. A similar process can be used for verifying the BIOS boot block 110 or 452 using the respective digital signature 424 or 458.

The private non-volatile memory 402 can also store policy information 434. For example, the policy information 434 can include information relating to one or multiple policies, including a policy specifying whether aggressive mode is to be used (as discussed above).

By using techniques or mechanisms according to some implementations, the embedded controller 102 is able to retrieve and verify system boot code in the shared non-volatile memory 104 in a safe manner, by ensuring that no other entity (such as the core logic 106) is on the shared bus 120. Also, this safe retrieval and verification of system boot code can be performed in an environment where an entity may be present that remains enabled on the shared bus 120 even though the computing system 100 is in a state where the processor is disabled.

Machine-readable instructions of various modules described above are loaded for execution on a processing circuit (e.g. embedded controller 102 or processor 302). A processing circuit can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A controller comprising:
    an interface to a bus that is shared by the controller with core logic; and
    a processing circuit to:
        monitor for an indication from the core logic indicating that the core logic is in a state in which the core logic does not access the bus;
        in response to detecting the indication, retrieve system boot code from a non-volatile memory over the bus; and
        verify the retrieved system boot code;
        wherein the processing circuit is to perform the monitoring, retrieving, and verifying during a state in which a processor is disabled or not accessing the bus, and further wherein the indication includes a signal having a state indicating that power is allowed to be removed from an entity of the core logic, the entity being able to remain operational in the state in which the processor is disabled.

2. The controller of claim 1, wherein the interface is connected to the bus that is also connected to the core logic.

3. The controller of claim 1, wherein the controller is an embedded controller to perform at least one selected from among: power supply control in the system, thermal monitoring in the system, fan control in the system, battery charging and control in the system, and interaction with a user input device.

4. The controller of claim 1, wherein the entity is a management engine or a platform security processor.

5. The controller of claim 1, wherein the processing circuit is to further provide a signal to block a power-good indication from the core logic, the power-good indication indicating that a power supply voltage of a power supply is within a specified range.

6. The controller of claim 1, wherein the verifying of the system boot code uses a signature associated with the system boot code.

7. The controller of claim 1, wherein the system boot code includes a boot block.

8. A system comprising:
    a non-volatile memory storing system boot code;
    a bus;
    core logic connected to the bus: and
    an embedded controller connected to the bus, wherein the embedded controller is to:
        monitor for an indication from the core logic indicating that the core logic is in a state in which the core logic is off the bus;
        in response to detecting the indication, retrieve the system boot code from the non-volatile memory over the bus; and
        block resuming of the core logic while the embedded controller is retrieving the system boot code comprising maintaining a battery-low indication.

9. The system of claim 8, further comprising a processor, wherein the core logic is able to access the bus to retrieve the system boot code from the non-volatile memory for execution by the processor.

10. The system of claim 8, further comprising:
    a power supply to output at least one power supply voltage, wherein a power-good indication is provided by the power supply in response to the at least one power supply voltage being within a range that is useable by components of the system, wherein blocking the resuming of the core logic comprises blocking the power-good indication from being provided to the core logic.

11. The system of claim 8, wherein the embedded controller is to further assert a reset signal to force the core logic off the bus.

12. A method comprising:
    monitoring, by a controller connected to a bus, for an indication from core logic connected to the bus, the indication indicating that the core logic is in a state in which the core logic does not access the bus;
    in response to detecting the indication, retrieving, by the controller, system boot code from a non-volatile memory over the bus; and
    verifying, by the controller, the retrieved system boot code;
    wherein the indication that the core logic is in the state in which the core logic does not access the bus comprises an indication that power is allowed to be removed from an entity of the logic core, the entity being capable of remaining operational in a state in which a processor of the core logic is disabled or not accessing the bus.

* * * * *